(12) United States Patent
Lee et al.

(10) Patent No.: US 7,493,114 B2
(45) Date of Patent: Feb. 17, 2009

(54) METHOD AND APPARATUS OF NOTIFYING USER OF SERVICE AREA AND SERVICE TYPE FOR A MOBILE TERMINAL

(75) Inventors: Jae-Ho Lee, Gumi-si (KR); Do-Hwan Choi, Daegu (KR); Jun Yoon, Gumi-si (KR); Hark-Sang Kim, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 28 days.

(21) Appl. No.: 11/104,407

(22) Filed: Apr. 13, 2005

(65) Prior Publication Data

US 2006/0052098 A1 Mar. 9, 2006

(30) Foreign Application Priority Data

Sep. 7, 2004 (KR) ............... 10-2004-0071256

(51) Int. Cl.
*H04Q 7/20* (2006.01)
(52) U.S. Cl. .............. 455/422.1; 455/412.2; 455/404.1; 455/414.1; 455/432.3; 455/433; 455/435.1; 455/435.2; 455/436; 455/437
(58) Field of Classification Search .............. 455/452.2, 455/442, 412, 404.1, 414.1, 432.3, 433, 435.1, 455/435.2, 436, 437
See application file for complete search history.

(56) References Cited

U.S. PATENT DOCUMENTS

| 4,683,459 | A | 7/1987 | Edson |
| 6,512,752 | B1* | 1/2003 | H'mimy et al. ............. 370/329 |
| 6,741,843 | B1* | 5/2004 | Kalliokulju et al. ...... 455/452.2 |
| 6,799,038 | B2* | 9/2004 | Gopikanth ............... 455/435.2 |
| 2001/0030953 | A1* | 10/2001 | Chang ........................ 370/331 |
| 2002/0039892 | A1* | 4/2002 | Lindell .................... 455/151.1 |
| 2004/0152419 | A1 | 8/2004 | Lee |
| 2005/0233749 | A1* | 10/2005 | Karaoguz et al. .......... 455/442 |

FOREIGN PATENT DOCUMENTS

| EP | 0 310 379 A2 | 4/1989 |
| EP | 0 310 379 A3 | 4/1989 |
| EP | 1 079 540 A2 | 2/2001 |
| EP | 1 220 560 A2 | 7/2002 |
| EP | 1 220 560 A3 | 9/2002 |
| EP | 1 079 540 A3 | 4/2004 |
| WO | WO 02-11475 A1 | 2/2002 |

* cited by examiner

*Primary Examiner*—David Q Nguyen
(74) *Attorney, Agent, or Firm*—Roylance, Abrams, Berdo & Goodman, LLP

(57) ABSTRACT

A service area notification method in a mobile terminal wherein a current received signal strength of the mobile terminal is detected, and a service area corresponding to the current received signal strength is determined from among a plurality of service areas distinguished according to received signal strength. The user is then notified of the determined service area and the service types available in the service area.

16 Claims, 3 Drawing Sheets

METHOD AND APPARATUS OF NOTIFYING USER OF SERVICE AREA AND SERVICE TYPE FOR A MOBILE TERMINAL

CROSS-REFERENCE TO RELATED APPLICATIONS

This application claims the benefit under 35 U.S.C. §119(a) of Korean Patent Application No. 10-2004-0071256 entitled "Method Of Notifying Of Service Area In A Mobile Terminal" filed in the Korean Intellectual Property Office on Sep. 7, 2004, the entire disclosure of which is incorporated herein by reference.

BACKGROUND OF THE INVENTION

1. Field of the Invention

The present invention relates generally to a service area notification method in a mobile terminal. In particular, the present invention relates to a method of notifying a mobile terminal user about which service area his mobile terminal is located in and what service types are available in the service area, through the mobile terminal.

2. Description of the Related Art

Typically, a mobile terminal refers to a device, such as a cellular phone, PDA (Personal Digital Assistant), PCS (Personal Communication Service) phone, IMT-2000 (International Mobile Telecommunication-2000) terminal, GSM (Global System for Mobile Communication) terminal, or W-LAN (Wireless-Local Areas Network) terminal, that provides a communications function for enabling users to converse while roaming or to exchange data.

The mobile terminal is increasingly considered a necessity, to be carried at all times by any number of worldwide users irrespective of gender and age. The trend of the mobile terminal is toward small size, slimness, lightweight, and multimedia functionality, while taking into account the portability of the device.

In the existing mobile communication system implemented with current mobile terminals (that is, mobile stations, hereinafter referred to as MSs), the entire service area is segmented into relatively small radio areas called cells wherein a number of services are provided in each of the cells.

This mobile communication system is typically comprised of a plurality of base stations (hereinafter referred to as BSs) that cover the cells and MSs that communicate by establishing radio channels with the BSs.

Major access schemes between the BSs and the MSs include FDMA (Frequency Division Multiple Access), TDMA (Time Division Multiple Access), and CDMA (Code Division Multiple Access). In any of the above access schemes, a BS transmits a channel signal by which an MS identifies the BS for access.

The proliferation of such mobile terminals has led to the increase in various services that the BSs can provide to MSs.

However, an MS can transmit/receive a radio signal only within a service area, and available services are distinguished for the MS according to received signal strength indications in the service area.

Therefore, when the MS is out of the service area, it typically outputs an out-of-service area notification message (e.g. NOSVC) to a display.

That is, when the user is out of the range of the service area while roaming and moves to a no-service area, the MS displays a predetermined message or turns on/off a predetermined icon to notify the user that he is out of the service area.

However, it would also be beneficial for the user to be further informed of available service types according to the current received signal strength, rather than to be simply notified that he is out of a service area when he moves out of the service area.

Accordingly, a need exists for a system and method for notifying a user of current service areas and of the service types available in the current service areas.

SUMMARY OF THE INVENTION

An object of the present invention is to substantially solve at least the above problems and disadvantages, and to provide at least the advantages below. Accordingly, an object of the present invention is to provide a method of notifying a mobile terminal user about which service area his mobile terminal is located in and what service types are available in the service area, through the mobile terminal.

The above and other objects are substantially achieved by providing a service area notification system and method in a mobile terminal, including a controller for detecting a signal strength, a display for notifying a user about available service types, and an audio processor for providing notice as a voice message or alarm sound. A currently received signal strength of the mobile terminal is detected, and a service area corresponding to the currently received signal strength is determined from among a plurality of service areas distinguished according to received signal strength. The user is then notified of the determined service area and service type available in the service area.

It is preferred that information regarding the plurality of service areas distinguished according to received signal strength and service types available in the service areas are stored in the device for reference.

BRIEF DESCRIPTION OF THE DRAWINGS

The above and other objects, features and advantages of the present invention will become more apparent from the following detailed description when taken in conjunction with the accompanying drawings in which.

Throughout the drawings, like reference numerals will be understood to refer to like parts, components and structures.

DETAILED DESCRIPTION OF EXEMPLARY EMBODIMENTS

An exemplary embodiment of the present invention will be described herein below with reference to the accompanying drawings. In the following description, functions or constructions that are well-known to those skilled in the art are not described in detail since they would obscure the invention in unnecessary detail.

Figure 1:
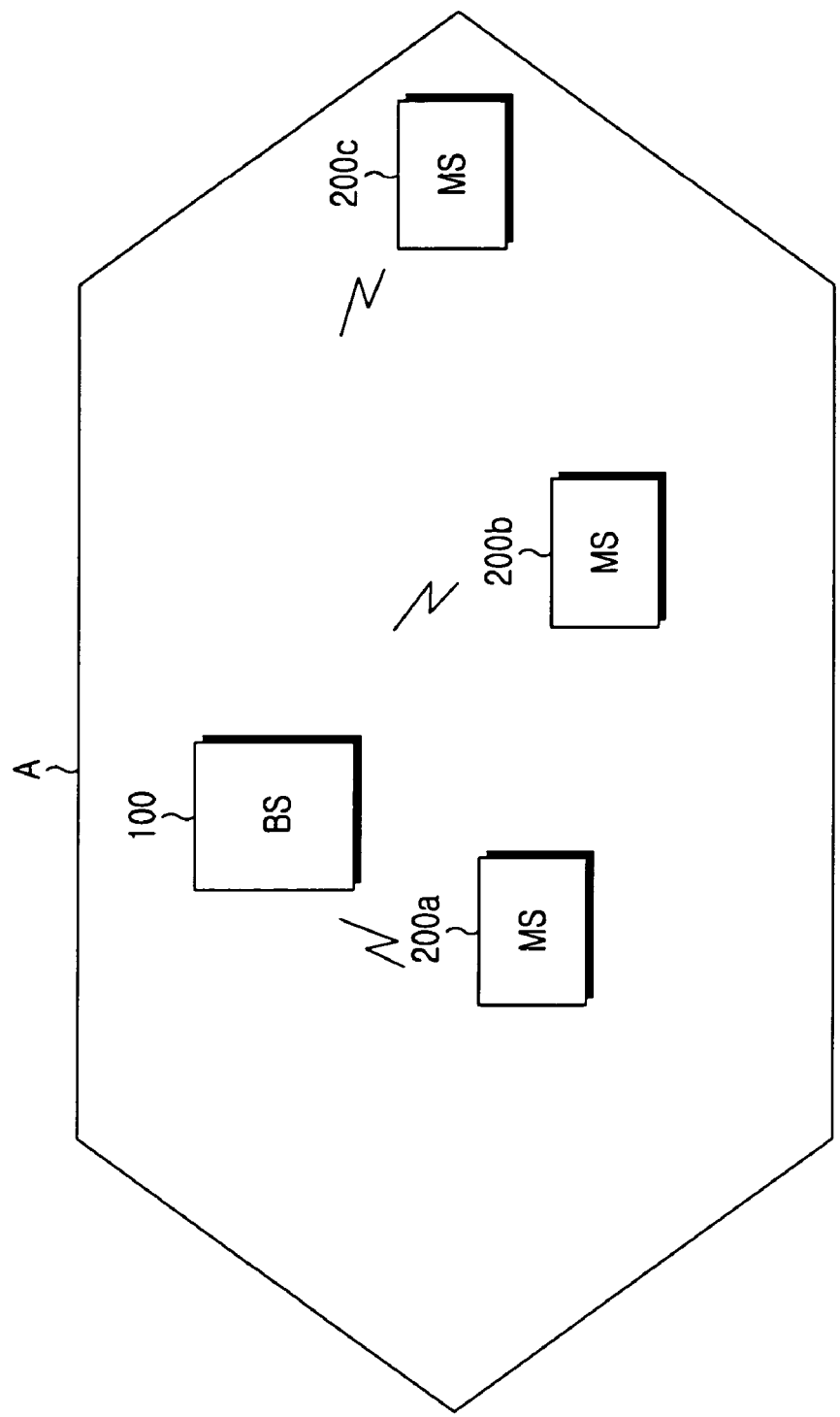
FIG. 1 illustrates an example configuration of a conventional mobile communication system.

FIG. 1 illustrates an exemplary configuration of a typical mobile communication system. Referring to FIG. 1, a BS 100 and MSs 200a, 200b and 200c are shown located within a cell (that is, cell A), wherein MSs 200a, 200b and 200c are under the control of the BS 100. The BS 100 transmits a channel signal by which the MSs 200a, 200b and 200c can identify the BS 100 to be accessed. The MSs 200a, 200b and 200c establish radio channels and communicate with the BS 100 on the radio channels.

The received signal strengths of the MSs 200a, 200b and 200c from the BS 100 are inversely proportion to their distances to the BS 100. However, if many MSs are in the vicinity of the BS 100 and thus, a cell density increases, the received signal strengths also decrease. Among the MSs 200a, 200b and 200c, the MS 200a nearest to the BS 100 has the highest received signal strength, while the MS 200c remotest from the BS 100 has the lowest received signal strength.

Figure 2:
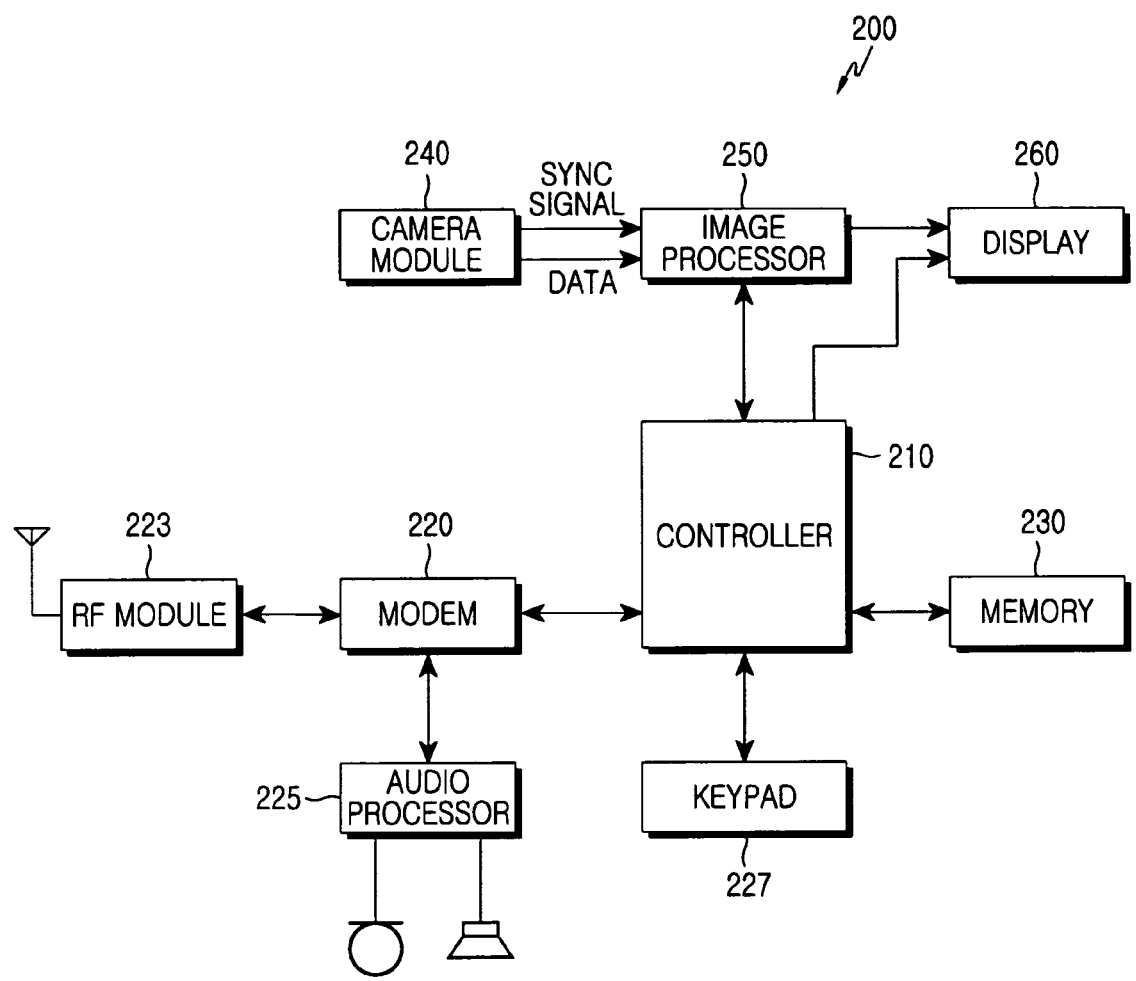
FIG. 2 is a block diagram of an MS according to an embodiment of the present invention.

FIG. 2 is a block diagram of an exemplary MS 200 provided with a camera according to an embodiment of the present invention.

Referring to FIG. 2, the MS 200 is comprised of a controller 210, a MODEM 220, an RF (Radio Frequency) module 223, an audio processor 225, a keypad 227, a memory 230, a camera module 240, an image processor 250, and a display 260.

The RF module 223 substantially controls the communications in the mobile terminal 200. The RF module 223 includes an RF transmitter (not shown) for upconverting and amplifying a transmission signal, and an RF receiver (not shown) for low-noise amplifying and downconverting a received signal. In doing so, the RF module 223 can comprise an RF processor (not shown), an IF (Intermediate Frequency) processor (not shown), and a baseband processor (not shown).

The MODEM 220 is provided with a transmitter (not shown) for encoding and modulating the transmission signal, and a receiver (not shown) for demodulating and decoding the received signal.

The audio processor 225 may comprise a CODEC (not shown), which may include a data CODEC for processing packet data, and an audio CODEC for processing an audio signal including voice.

The audio processor 225 converts a digital audio signal received from the MODEM 220 into an analog signal through the audio CODEC prior to reproduction, or converts an analog audio signal generated from a microphone into a digital audio signal and transmits it to the MODEM 220. The CODEC may be provided separately or may be incorporated into the controller 210.

The keypad 227 can be configured to have a key matrix structure (not shown). The keypad 227 includes alphanumerical keys, function keys, and a volume key located on the portable terminal, and can output a key input signal to the controller 210 corresponding to a key pressed by the user.

The memory 230 may be configured to include a program memory and a data memory. The program memory stores programs for controlling the typical operations of the portable terminal 200. According to an embodiment of the present invention, the program memory stores a program for notifying the user about which service area he is located in according to a received signal strength, and what service types are available in the service area. The data memory temporarily stores data generated during the execution of the programs.

The memory 230 further stores a table of a plurality of service areas distinguished according to received signal strengths of the MS, and service types available in the service areas, as illustrated in Table 1 below.

TABLE 1

| Received signal strength | Service area | Available service type |
| --- | --- | --- |
| $1^{st}$ threshold (1 Mbps or above) | $1^{st}$ service area | QoS-sensitive streaming service (moving pictures) and every data communication |
| $2^{nd}$ threshold (384 Kbps or above and below 1 Mbps) | $2^{nd}$ service area | General data communication service (still image and wireless Internet) |
| $3^{rd}$ threshold (below 384 Kbps) | $3^{rd}$ service area | Voice call, message transmission/reception |
| 0 | No-service area | Only functionalities of the terminal itself |

Referring to Table 1, if the strength of a received signal at the MS 200 is equal to or greater than the first threshold, the area in which the MS is now located is the first service area and every radio data communication service including a QoS-sensitive streaming service (e.g. reception of moving pictures), is available to the MS while in the first service area.

If the received signal strength falls within the second threshold range, the MS 200 is now located in the second service area which supports general data communication services including still image file transmission or wireless Internet, except for the QoS-sensitive streaming service.

If the received signal strength falls within the third threshold range, the MS 200 is now located in the third service area, and voice call and message transmission/reception are available to the MS while in the third service area. If the received signal strength is zero, all radio communication services are unavailable except for the functionality of the MS itself.

It is to be understood herein that Table 1 is a mere exemplary application and thus, the threshold ranges of column 1, service classifications of column 2, and available service types of column 3 are changeable in yet other embodiments of the present invention:

Returning to FIG. 2, the controller 210 provides overall control for the MS 200, and may include the MODEM 220 and the CODEC.

According to an embodiment of the present invention, the controller 210 measures the strength of a signal received at an antenna of the MS 200, determines a current service area according to the received signal strength, determines service types available in the service area by referring to Table 1 stored in the memory 230, and displays the applicable service area and the service types on the display 260.

The controller 210 can notify the user of the service area and the service types using a voice message, text message, alarm sound, color icon, or an avatar.

The camera module 240 can be used in the exemplary embodiment of the present invention to capture an image. It includes a camera sensor (not shown) for converting the captured optical signal into an electrical signal, and a signal processor (not shown) for converting the analog image signal received from the camera sensor into digital data. The signal processor can be implemented as a DSP (Digital Signal Processor).

The image processor 250 generates image data to display the image signal received from the camera module 240.

The image processor 250 processes the image signal received from the camera module 240 on a frame basis, and outputs the frame image data according to the characteristics and size of the display 260. The image processor 250 is provided with an image CODEC (not shown) for compressing the frame image data to be displayed using a predetermined method, or decompressing the compressed frame image data into the original frame image data.

The image CODEC can be one of a JPEG CODEC, an MPEG4 CODEC, and a Wavelet CODEC. In the exemplary embodiment of the present invention, it can be assumed that the image processor 250 has an OSD (On Screen Display) function and outputs OSD data according to a screen size under the control of the controller 210.

The display 260 displays the image data received from the image processor 250 and user data received from the controller 210. The display 260 may use an LCD (Liquid Crystal Display) (not shown). In this case, the display 260 includes an LCD controller, a memory for storing image data, and an LCD device. If the LCD is implemented as a touch screen, the display 260 can further serve as an input portion.

According to an embodiment of the present invention, under the control of the controller 210, the display 260 notifies the user of a service area wherein the MS 200 is located, and what service types are available in the service area.

In operation, when the user dials through the keypad 227 and sets an origination mode, the controller 210 senses the origination mode, processes received dialing information through the MODEM 220, and converts the processed information into an RF signal through the RF module 223 prior to transmission. Upon the generation of a response signal from another party, the controller 210 senses the response signal through the RF module 223 and the MODEM 220. A voice communication path is then established through the audio processor 225 so that the user can converse.

In a termination mode, the controller 210 senses the termination mode through the MODEM 220 and generates a ring signal through the audio processor 225. When the user answers, the controller 210 senses the answer and establishes the voice communication path through the audio processor 225 so that the user can converse.

While the origination and termination modes have been described in relation to a voice call, they are applied in substantially the same manner for data communication, including packet data and image data. In an idle mode or in text communications, the controller 210 displays the text data processed by the MODEM 220 on the display 260.

An exemplary operation for notifying a user of a service area wherein the MS 200 is located according to the received signal strength of the MS, and for further notifying a user of service types available in the service area, will now be described in greater detail with reference to FIG. 3.

Figure 3:
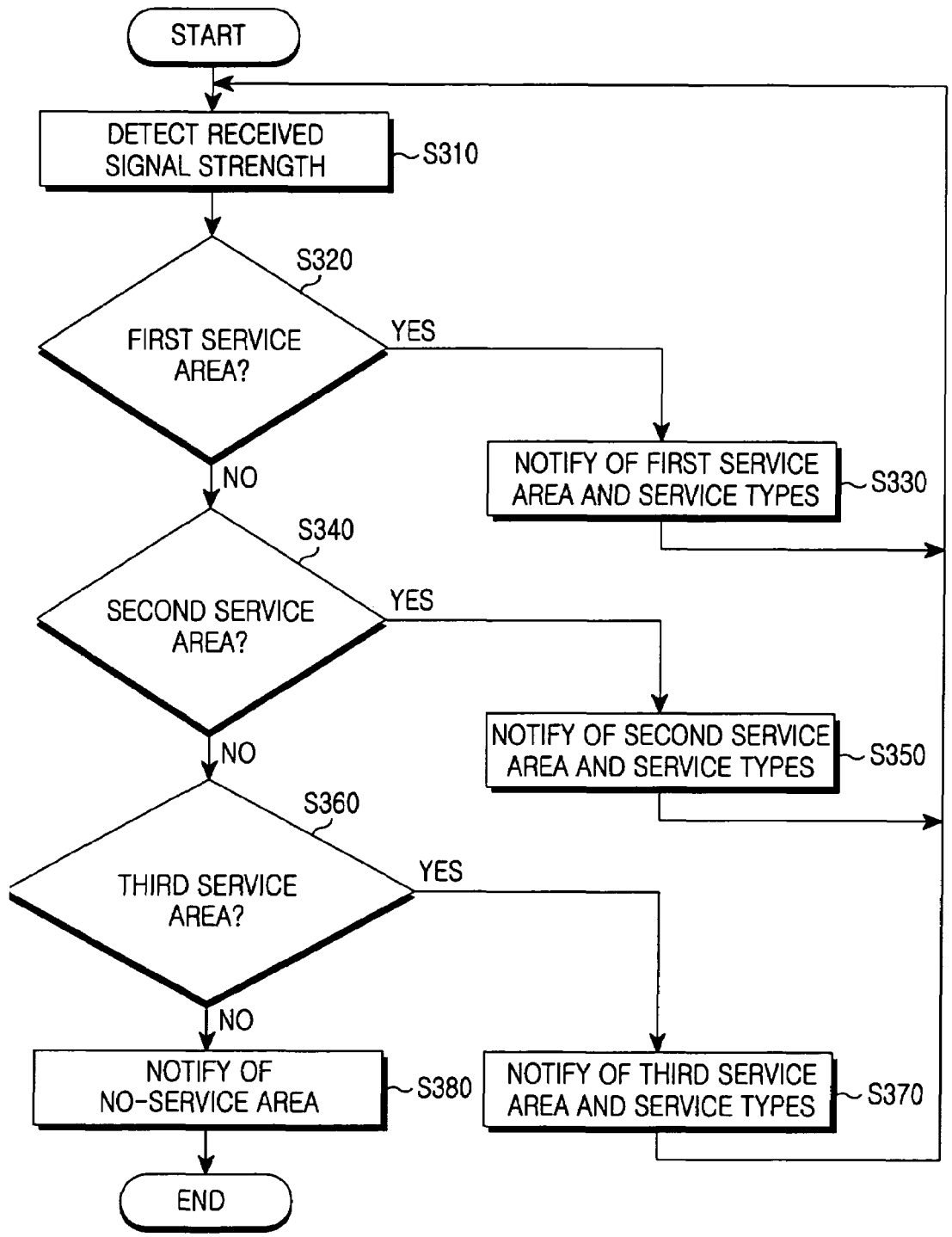
FIG. 3 is a flowchart illustrating an exemplary method for notifying a user about which service area the MS is located in and what service types are available in the service area, according to an embodiment of the present invention.

FIG. 3 is a flowchart illustrating an exemplary method for notifying a user about a service area wherein the MS 200 is located, and what service types are available in the service area according to an embodiment of the present invention.

In accordance with an exemplary embodiment of the present invention, a total of four illustrative service areas are defined according to received signal strength as illustrated in Table 1. That is, the method depicted in FIG. 3 is performed under the assumption that the received signal strength ranges for the first, second and third service areas, and the no-service area are respectively set as the first threshold range (e.g. 1 Mbps or above), the second threshold range (e.g. 384 kbps or above, but below 1 Mbps), the third threshold range (e.g. below 384 kbps, but above zero), and zero.

The present invention is not limited to the above specific values, categories or ranges, and thus it is to be appreciated that the thresholds are changeable in yet other embodiments of the present invention.

Referring to FIGS. 2 and 3, the controller 210 first detects the strength of a signal received through the antenna of an MS 200 in step S310.

In step S320, the controller 210 compares the detected received signal strength with the threshold value ranges in the table stored in the memory 230 and determines whether the received signal strength falls within the first threshold range corresponding to the first service area wherein QoS-sensitive streaming service is available.

If the received signal strength corresponds to the first threshold range for the first service area, the controller 210 notifies the user of the first service area and the service types available in the first service area through the display 260 in step S330. Specifically, for the notification step, the controller 210 may output a voice message or an alarm sound through the audio processor 225, or may display a text message, color icon, or an avatar on the display 260, or may output a combination of the voice and text messages at the same time. The QoS-sensitive streaming service such as reception of moving pictures, and any other radio data communication service are available to the MS 200 while in the first service area.

If the received signal strength does not fall within the first threshold range in step S320, the controller 210 then determines whether it falls within the second threshold range for the second service area in step S340.

If the received signal strength corresponds to the second service area, the controller 210 notifies the user of the second service area supporting general data communication services through the display 260 or the audio processor, and notifies the user of the service types available in the second service area through the display 260 in step S350. The general data communication services include wireless Internet service, transmission/reception of still image files, voice call, and message transmission/reception, with the exception of the QoS-sensitive streaming service.

If the received signal strength does not fall within the second threshold range in step S340, the controller 210 then determines whether it falls within the third threshold range for the third service area in step S360.

If the received signal strength corresponds to the third service area, the controller 210 notifies the user of the third service area supporting voice call and message transmission/reception through the display 260 or the audio processor, and notifies the user of the service types available in the third service area through the display 260 in step S370. In the third service area, only voice call and message transmission/reception are available.

If the received signal strength is too weak to support voice call and message transmission/reception (for example, zero strength) in step S360, the controller 210 then determines that the MS 200 is located in the no-service area where radio communication is impossible and notifies the user of the no-service area through the display 260 or the audio processor 225 in step S380. In the no-service area, no radio data communication is available. However, if the MS 200 is equipped with a camera, it can perform a multimedia function like photographing.

Notably, the method of FIG. 3 has been described above given that the received signal strength becomes weak as the MS 200 is located farther from the BS 100 as illustrated and described in regard to FIG. 1, for example, as the MS 200 is moving farther from the BS 100. However, even when in the vicinity of the BS 100, if many other MSs 200 are located in the same area such that cell density is increased, the received signal strength also becomes weak.

In accordance with the present invention as described above, the user of an MS is notified of service areas according to received signal strength and is further notified of the service types available in the service areas. Therefore, the user can easily determine the current service area and the service types available in the current service area.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A service area notification method in a mobile terminal, comprising the steps of:
    detecting a current received signal strength of the mobile terminal;
    comparing the received signal strength with a threshold value range for each of service areas distinguished into a first service area, wherein streaming service is available, a second service area, wherein general data communication is available, a third service area, wherein voice call and message transmission/reception are available, and a no-service area, wherein radio communication is impossible, to determine a service area based upon the value of the received signal strength;
    comparing the determined service area with a plurality of service types to determine one or more service types available to the mobile terminal in the determined service area; and
    notifying a user of the determined service area and the service types available in the determined service area.

2. The service area notification method of claim 1, further comprising the step of:
    storing the plurality of service areas distinguished according to received signal strength and service types available.

3. The service area notification method of claim 1, wherein the step of determining the service types comprises the steps of:
    determining whether the current received signal strength falls within a first range corresponding to a first service area wherein at least QoS (Quality of Service)-sensitive streaming service is available;
    determining whether the current received signal strength falls within a second range corresponding to a second service area wherein at least general data communication services are available if the current received signal strength does not fall within the first range;
    determining whether the current received signal strength falls within a third range corresponding to a third service area wherein at least voice call and message transmission/reception are available if the current received signal strength does not fall within the second range; and
    determining that the mobile terminal is located in a no-service area wherein radio communication is substantially impossible if the current received strength does not fall within the third range.

4. The service area notification method of claim 1, wherein the notification step comprises the step of:
    notifying the user about the service types available in the determined service area by providing at least one of a voice message, a text message, an alarm sound, a color icon, and an avatar.

5. The service area notification method of claim 3, wherein the general data communication services comprise wireless Internet service, still image file transmission/reception, voice call, and message transmission/reception.

6. A mobile terminal providing service area notification, comprising:
    a controller for comparing a received signal strength with a threshold value range for each of service areas distinguished into a first service area, wherein streaming service is available, a second service area, wherein general data communication is available, a third service area, wherein voice call and message transmission/reception are available, and a no-service area, wherein radio communication is impossible, to determine a service area based upon the value of the received signal strength, and then comparing the determined service area with a plurality of service types to determine one or more service types available to the mobile terminal in the determined service area;
    a display for notifying the user about the service types available in the determined service area by providing at least one of a text message, a color icon, and an avatar; and
    an audio processor for notifying the user about the service types available in the determined service area by providing at least one of a voice message and an alarm sound.

7. The mobile terminal of claim 6, further comprising:
    a memory for storing the plurality of service areas distinguished according to received signal strength and service types available.

8. The mobile terminal of claim 6, wherein the controller further comprises:
    a first component for determining whether the current received signal strength falls within a first range corresponding to a first service area wherein at least QoS (Quality of Service)-sensitive streaming service is available;
    a second component for determining whether the current received signal strength falls within a second range corresponding to a second service area wherein at least general data communication services are available if the current received signal strength does not fall within the first range;
    a third component for determining whether the current received signal strength falls within a third range corresponding to a third service area wherein at least voice call and message transmission/reception are available if the current received signal strength does not fall within the second range; and
    a fourth component for determining that the mobile terminal is located in a no-service area wherein radio communication is substantially impossible if the current received strength does not fall within the third range.

9. The mobile terminal of claim 8, wherein the general data communication services comprise wireless Internet service, still image file transmission/reception, voice call, and message transmission/reception.

10. A service area notification method in a mobile terminal, comprising the steps of:
    detecting a current received signal strength of the mobile terminal;
    determining a service area and service types corresponding to the current received signal strength from among a plurality of service areas, respective ones of said plurality of service areas being distinguished according to received signal strength and service types available, wherein the step of determining the service types comprises the steps of:
    determining whether the current received signal strength falls within a first range corresponding to a first service area wherein at least QoS (Quality of Service)-sensitive streaming service is available;

determining whether the current received signal strength falls within a second range corresponding to a second service area wherein at least general data communication services are available if the current received signal strength does not fall within the first range;

determining whether the current received signal strength falls within a third range corresponding to a third service area wherein at least voice call and message transmission/reception are available if the current received signal strength does not fall within the second range; and determining that the mobile terminal is located in a no-service area wherein radio communication is substantially impossible if the current received strength does not fall within the third range; and notifying a user of the determined service area and the service types available in the determined service area.

11. The service area notification method of claim 10, further comprising the step of:

storing the plurality of service areas distinguished according to received signal strength and service types available.

12. The service area notification method of claim 10, wherein the notification step comprises the step of:

notifying the user about the service types available in the determined service area by providing at least one of a voice message, a text message, an alarm sound, a color icon, and an avatar.

13. The service area notification method of claim 10, wherein the general data communication services comprise wireless Internet service, still image file transmission/reception, voice call, and message transmission/reception.

14. A mobile terminal providing service area notification, comprising:

a controller for detecting a current received signal strength of the mobile terminal and determining a service area and service types corresponding to the current received signal strength from among a plurality of service areas distinguished respectively according to received signal strength and service types available, wherein the controller comprises:

a first component for determining whether the current received signal strength falls within a first range corresponding to a first service area wherein at least QoS (Quality of Service)-sensitive streaming service is available;

a second component for determining whether the current received signal strength falls within a second range corresponding to a second service area wherein at least general data communication services are available if the current received signal strength does not fall within the first range;

a third component for determining whether the current received signal strength falls within a third range corresponding to a third service area wherein at least voice call and message transmission/reception are available if the current received signal strength does not fall within the second range; and a fourth component for determining that the mobile terminal is located in a no-service area wherein radio communication is substantially impossible if the current received strength does not fall within the third range;

a display for notifying the user about the service types available in the determined service area by providing at least one of a text message, a color icon, and an avatar; and an audio processor for notifying the user about the service types available in the determined service area by providing at least one of a voice message and an alarm sound.

15. The mobile terminal of claim 14, further comprising:

a memory for storing the plurality of service areas distinguished according to received signal strength and service types available.

16. The mobile terminal of claim 14, wherein the general data communication services comprise wireless Internet service, still image file transmission/reception, voice call, and message transmission/reception.

* * * * *